US008078683B2

(12) United States Patent
Lalonde et al.

(10) Patent No.: US 8,078,683 B2
(45) Date of Patent: *Dec. 13, 2011

(54) METHOD AND APPARATUS FOR AUTHENTICATING ELECTRONIC COMMUNICATION

(75) Inventors: Chris Lalonde, Campbell, CA (US); Marty Abbott, Morgan Hill, CA (US); Kirk Sanford, Liberty, MO (US); Greg Isaacs, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,808

(22) Filed: Sep. 17, 2010

(65) Prior Publication Data

US 2011/0010426 A1    Jan. 13, 2011

Related U.S. Application Data

(63) Continuation of application No. 11/959,638, filed on Dec. 19, 2007, now Pat. No. 7,831,671, which is a continuation of application No. 11/421,246, filed on May 31, 2006, now Pat. No. 7,320,021, which is a continuation of application No. 10/266,384, filed on Oct. 7, 2002, now Pat. No. 7,072,944.

(51) Int. Cl.
*G06F 15/16* (2006.01)
(52) U.S. Cl. ............ 709/206; 709/207; 709/229
(58) Field of Classification Search .......... 709/206, 709/207, 229
See application file for complete search history.

(56) References Cited

U.S. PATENT DOCUMENTS

| | | |
|---|---|---|
| 5,651,069 A | 7/1997 | Rogaway |
| 5,682,460 A | 10/1997 | Hyziak |
| 5,793,497 A | 8/1998 | Funk |
| 5,898,836 A | 4/1999 | Freivald et al. |
| 6,182,227 B1 | 1/2001 | Blair |
| 6,266,692 B1 | 7/2001 | Greenstein |
| 6,321,267 B1 | 11/2001 | Donaldson |
| 6,330,590 B1 * | 12/2001 | Cotten ............ 709/206 |
| 6,443,686 B1 | 9/2002 | Wiesler et al. |
| 6,640,301 B1 * | 10/2003 | Ng ............ 713/156 |
| 6,643,686 B1 * | 11/2003 | Hall ............ 709/206 |
| 6,650,890 B1 * | 11/2003 | Irlam et al. ............ 455/412.1 |
| 6,684,248 B1 * | 1/2004 | Janacek et al. ............ 709/225 |
| 6,691,156 B1 * | 2/2004 | Drummond et al. ......... 709/206 |
| 6,742,036 B1 | 5/2004 | Das et al. |

(Continued)

OTHER PUBLICATIONS

"U.S. Appl. No. 10/266,384, Advisory Action mailed May 9, 2005", 3 pgs.

(Continued)

*Primary Examiner* — Liangche A Wang
(74) *Attorney, Agent, or Firm* — Schwegman, Lundberg & Woessner, P.A.

(57) ABSTRACT

One embodiment provides a method for authenticating an electronic communication. The method includes parsing a header of the electronic communication to identify actual domain name data included in the header at a server receiving the electronic communication from a communication client; parsing the header to obtain purported sender data included in the header of the electronic communication; comparing the actual domain name data and purported sender data; and generating in response to the comparison an authenticity indicator, to provide a recipient of the electronic communication with an indication of the likelihood that the electronic communication was sent from a purported sender of the electronic communication.

20 Claims, 8 Drawing Sheets

U.S. PATENT DOCUMENTS

| | | | |
|---|---|---|---|
| 6,760,752 B1* | 7/2004 | Liu et al. | 709/206 |
| 6,779,178 B1* | 8/2004 | Lloyd et al. | 717/174 |
| 7,072,944 B2* | 7/2006 | Lalonde et al. | 709/206 |
| 7,127,491 B2 | 10/2006 | Zirnstein, Jr. | |
| 7,320,021 B2 | 1/2008 | Lalonde et al. | |
| 7,831,671 B2 | 11/2010 | Lalonde et al. | |
| 2002/0016818 A1 | 2/2002 | Kirani | |
| 2002/0027677 A1* | 3/2002 | Toyoda et al. | 358/402 |
| 2002/0080938 A1 | 6/2002 | Alexander, III | |
| 2002/0116641 A1 | 8/2002 | Mastrianni et al. | |
| 2002/0199120 A1* | 12/2002 | Schmidt | 713/201 |
| 2003/0187942 A1* | 10/2003 | Quine et al. | 709/207 |
| 2004/0024623 A1 | 2/2004 | Ciscon et al. | |
| 2004/0024823 A1 | 2/2004 | Del Monte | |
| 2004/0111480 A1* | 6/2004 | Yue | 709/206 |
| 2006/0206572 A1 | 9/2006 | Lalonde et al. | |
| 2008/0098077 A1 | 4/2008 | Lalonde et al. | |

OTHER PUBLICATIONS

"U.S. Appl. No. 10/266,384, Appeal Brief filed Jun. 21, 2005", 28 pgs.

"U.S. Appl. No. 10/266,384, Final Office Action mailed Mar. 17, 2005", 10 pgs.

"U.S. Appl. No. 10/266,384, Final Office Action mailed Oct. 26, 2004", 12 pgs.

"U.S. Appl. No. 10/266,384, Non Final Office Action mailed Mar. 16, 2004", 9 pgs.

"U.S. Appl. No. 10/266,384, Notice of Allowance mailed Feb. 9, 2006", 15 pgs.

"U.S. Appl. No. 10/266,384, Response filed Jan. 11, 2005 to Final Office Action mailed Oct. 26, 2004", 13 pgs.

"U.S. Appl. No. 10/266,384, Response filed Apr. 21, 2005 to Final Office Action mailed Mar. 17, 2005", 15 pgs.

"U.S. Appl. No. 10/266,384, Response filed Jul. 14, 2004 to Non Final Office Action mailed Mar. 16, 2004", 19 pgs.

"U.S. Appl. No. 11/421,246, Advisory Action mailed Jul. 10, 2007", 3 pgs.

"U.S. Appl. No. 11/421,246, filed Jul. 20, 2007", 3 pgs.

"U.S. Appl. No. 11/421,246, Final Office Action mailed Apr. 23, 2007", 8 pgs.

"U.S. Appl. No. 11/421,246, Non Final Office Action mailed Nov. 17, 2006", 9 pgs.

"U.S. Appl. No. 11/421,246, Notice of Allowance mailed Aug. 24, 2007", 8 pgs.

"U.S. Appl. No. 11/421,246, Response filed Feb. 19, 2007 to Non Final Office Action mailed Nov. 17, 2006", 15 pgs.

"U.S. Appl. No. 11/421,246, Response filed Jun. 25, 2007 to Final Office Action mailed Apr. 23, 2007", 14 pgs.

"U.S. Appl. No. 11/959,638, mailed Oct. 21, 2009", 3 pgs.

"U.S. Appl. No. 11/959,638, Non-Final Office Action mailed Mar. 10, 2010", 5 pgs.

"U.S. Appl. No. 11/959,638, Notice of Allowance mailed Jun. 28, 2010", 4.

"U.S. Appl. No. 11/959,638, Notice of Allowance mailed Nov. 4, 2009", 12 Pgs.

"U.S. Appl. No. 11/959,638, Response filed Jun. 10, 2010 to Non Final Office Action mailed Mar. 10, 2010", 7 pgs.

"China Application No. 200380101024.6, Office Action mailed Jul. 10, 2009", 1 pgs.

"Chinese Application No. 200380101024.6, Chinese Office Action mailed Oct. 10, 2008", 5 pgs.

"European application No. 03773179.1 office action mailed Sep. 21, 2009", 4.

"European Application Serial No. 03773179.1, Supplementary European Search Report mailed Apr. 2, 2009", 4 pgs.

Lindberg, G., "Anti-Spam Recommendations for SMTP MTAS", Internet Citation, (Feb. 1999), p. 15.

Lonn, R., "Re: automated spam detection", Internet Citation, (Feb. 16, 1999), p. 1-p. 2.

* cited by examiner

METHOD AND APPARATUS FOR AUTHENTICATING ELECTRONIC COMMUNICATION

RELATED APPLICATIONS

This application is a Continuation of U.S. application Ser. No. 11/959,638 filed Dec. 19, 2007 now U.S. Pat. No. 7,831,671 and entitled "AUTHENTICATING ELECTRONIC COMMUNICATIONS", which is a Continuation of U.S. application Ser. No. 11/421,246 filed May 31, 2006 and issued as U.S. Pat. No. 7,320,021 on Jan. 15, 2008, which is a Continuation of U.S. application Ser. No. 10/266,384 filed Oct. 7, 2002 and issued as U.S. Pat. No. 7,072,944 on Jul. 4, 2006, which applications are incorporated herein by reference.

TECHNICAL FIELD

The present application relates generally to the field of electronic communication and, more specifically, to a method and apparatus for authenticating electronic communication.

BACKGROUND

With the advent of the Internet, communication by electronic mail or email has become common practice. The Internet is also extensively used to conduct business transactions, and such transactions often require the exchange of confidential information such as credit card details, bank account details, passwords, personal details, and the like. Persons of devious intent often use so-called "spoofed" email messages in order to induce a recipient to furnish confidential information. The perpetrator then uses the confidential in formation in a fraudulent manner such as, for example, to bid on items, or post fictitious items, on an Internet auction web site.

An email message typically includes a header visible to a recipient that shows who purportedly sent the email ("FROM:" field), to whom the email was sent ("TO:" field), the subject matter of the email ("SUBJECT:" field) and the date and time of sending the email ("DATE:" field). In order to mislead the recipient or victim of the actual source of the email, a person launching a spoof attack typically alters the ("FROM:" field) to reflect a known or reliable source. Thus, when the recipient receives the spoofed email, the "FROM:" field may show an email address that is totally unrelated to the sender. If the recipient were to reply to the email, the sender may then obtain confidential information which the victim believes is being sent to a legitimate source.

BRIEF DESCRIPTION OF THE DRAWINGS

The present application is now described, by way of non-limiting example, with reference to the accompanying diagrammatic drawings in which like reference numerals are used to indicate the same or similar features.

DETAILED DESCRIPTION

A method and apparatus for authenticating electronic mail or email, is described. In the following description, for purposes of explanation, numerous specific details are set forth in order to provide a thorough understanding of the present application. It will be evident, however, to one skilled in the art that the present application may be practiced without these specific details.

Figure 1:
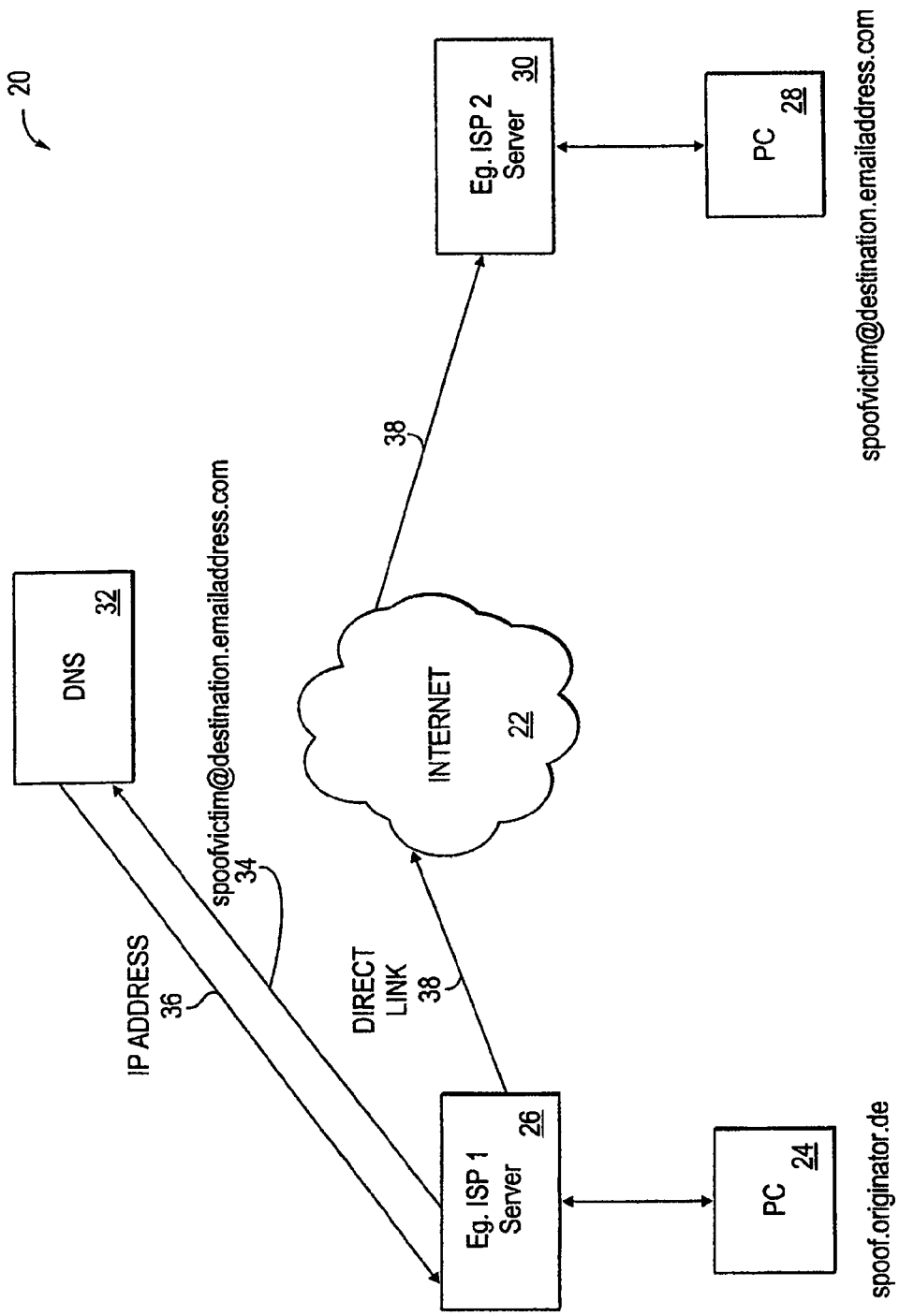
FIG. 1 shows a schematic block diagram of an exemplary hardware arrangement used in communicating electronic mail or email via the Internet.

Referring to the drawings, reference numeral 20 generally indicates an exemplary hardware arrangement for communicating an electronic message or email via the Internet 22. The arrangement 20 includes a client machine defined by a sender or source personal computer (PC) 24 connected to its associated Internet Service Provider (ISP) 26, and a further client machine defined by a destination PC 28 connected to its associated ISP 30. Although only two PCs 24, 28 are shown in the drawings, it will obviously be appreciated that the drawing in FIG. 1 is representative of any two PCs connected to the Internet which may communicate email between any one or more other PCs.

For the present discussion, the PC 24 is a source PC which may be used to communicate spoofed email to the destination PC 28. Spoofed email is typically email in which the sender or originator conceals, or attempts to conceal, his or her true identity to the recipient of the email. Concealing the source of the email is often linked to devious conduct in which the sender intends to induce the recipient to furnish confidential information such as bank account details, credit card details, personal details, or the like. Such details may be used, for example, in an Internet auction environment, to fraudulently bid on items up for auction, post fictitious items for sale, and other devious activities.

Returning to FIG. 1, when sending email, the PC 24 uses its mail client to communicate with the ISP 26. The ISP 26 identifies the destination email address from the email message received from the PC 24 and interrogates a Domain Name Server (DNS) 32 (see arrow 34). The DNS 32 uses the domain name (destination.emailaddress.com) of the destination email address to identify an IP address associated with the domain name. The DNS 32 then returns the associated IP address, as shown by arrow 36, to the ISP 26 thereby to identify the destination IP address of the email sent by the PC 24. The ISP 26, once it has identified the destination IP address, communicates the email message, via the Internet and direct links 38, to the ISP 30. The ISP 30 then typically identifies the recipient (spoofvictim) and then communicates the email to the PC 28. As discussed in more detail below, the email is disguised so that it appears to be from a legitimate source whereas, in fact, it has been sent from the spoof originator who is typically trying to obtain confidential data from the recipient or spoof victim.

Figure 2:
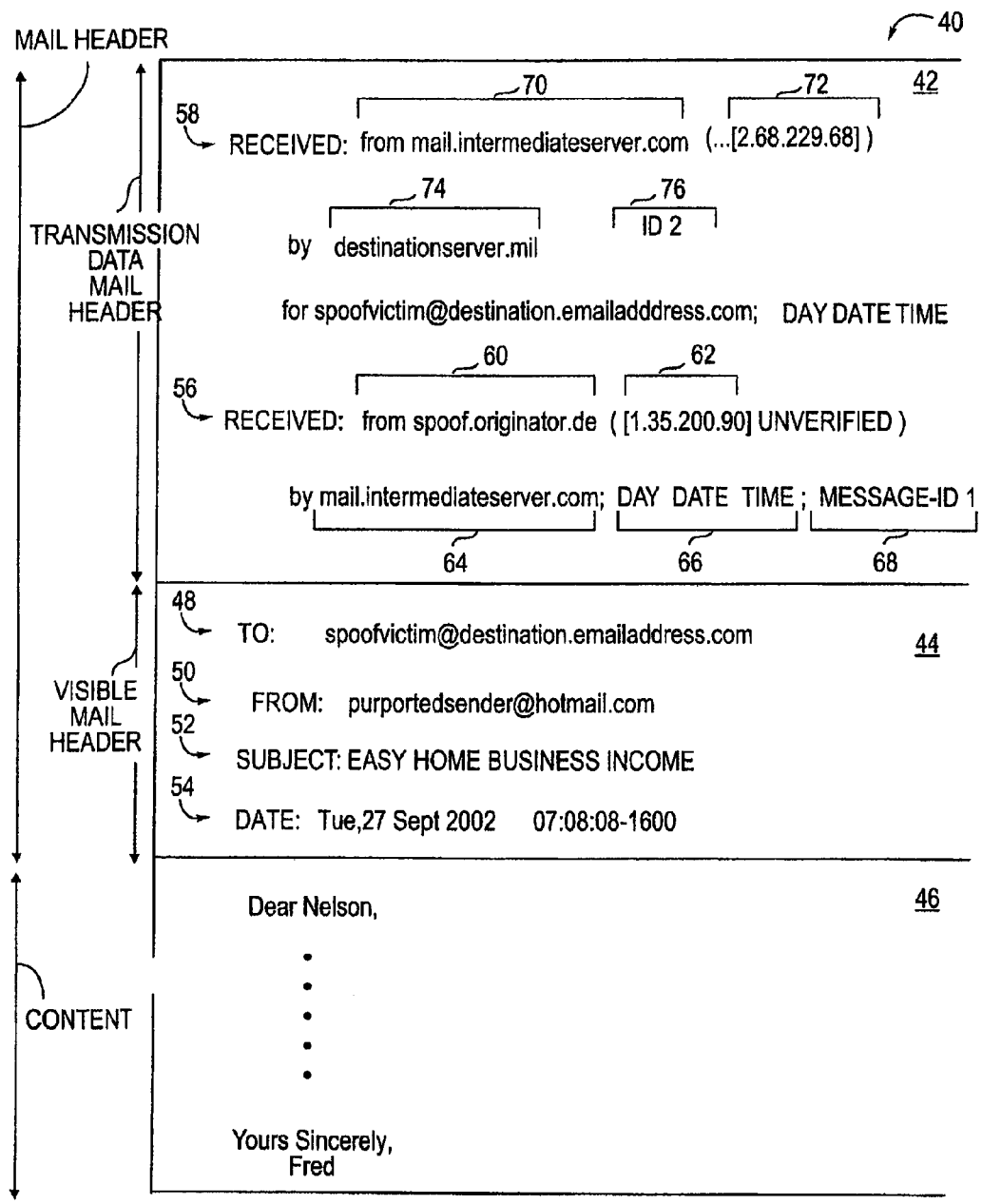
FIG. 2 shows a schematic representation of an exemplary header of email.

Referring in particular to FIG. 2, an exemplary email is generally indicated by reference numeral 40. The email 40 includes a transmission data mail header 42, a visible mail header 44 and a content portion 46. In the content portion 46, a user typically types the content of the message, or includes HTML pages or the like. The visible mail header 44 is typically that which is visible on a screen of a PC of the recipient which, in this case, is the spoof victim. In certain embodiments, the visible mail header 44 includes a "TO" field 48, a "FROM" field 50, a "SUBJECT" field 52 and a "DATE" field 54. Although most emails include the aforementioned four fields, it is to be appreciated that these are merely exemplary fields and, in certain circumstances, further or other fields may be provided. The transmission data mail header 42 is typically not visible to a recipient of the email who only sees the visible mail header 44 and the content portion 46.

The transmission data mail header 42 includes data included in the email 40 by each server via which the email 40 is communicated to the recipient or spoof victim. In one embodiment, the servers include two "RECEIVED" fields 56 and 58. It is to be appreciated that the number of RECEIVED fields 56, 58 is dependent of the number of servers via which the email 40 is communicated and, in certain circumstances, a single server may add more than one RECEIVED field 56, 58 due to internal processing. Each received field includes a "from" section, and IP address, a section including the name of the server receiving the email 40, a section including day, date, time details, and a section including a message ID which the server adds uniquely to identify the email 40.

Although many client applications automatically populate the FROM field 50 with the sender's email address, this field may however be changed with relative ease. For example, applications are freely available which allow the sender of an email to alter this field to reflect different sender information. As it is typically this field which is displayed to the recipient of the email, a sender of spoofed email 40 typically alters this field to show an email address of a trusted or legitimate sender. For example, the sender of spoofed email typically inserts a purported sender at a known or legitimate domain name in this field such as support@eBay.com, support@hotmail.com, or the like. Likewise, an appealing subject matter heading it typically included in the email 40 to encourage the recipient to respond, and the information included in the content portion 26 is typically equally misleading. In certain circumstances, a spoof sender may include a web page in the content portion 46 that requests confidential data from the recipient and, accordingly, if the recipient responds to the email, the spoof originator may then capture this confidential information as the victim is replying to the spoofed email address and not the purported email address displayed in the FROM field 50.

However, unlike the FROM field 50 in the visible header 44 that may be changed with relative ease, the RECEIVED field 56 in the transmission data mail header 42 generally includes accurate or actual data that correctly identifies the sender. Thus, the RECEIVED field 56 in its from section 60 includes the actual source of the email 40 (spoof.originator.de in the current example). Further, the RECEIVED field 56 also includes an actual IP address 62 which, in the present example, is shown as unverified. Further, the RECEIVED field 56 includes the name of the server 64 receiving the email 40 as well as comprehensive day, date and time information 66 and a message identification or ID 68, which is unique to the particular server. Thus, although the FROM field 50 in the visible mail header 44 has been altered to show a purported sender (purportedsender@hotmail.com) the actual sender (spoof.originator.de) is reflected in the transmission data mail header 42.

When the email 40 is passed on to one or more further servers, one or more further RECEIVED fields 58 are included in the transmission data mail header 42 of the email 40. For example, the RECEIVED field 58 includes in its from field 70 the domain name (mail.intermediateserver.com) of the server from which it has received the email 40 (see name of the server 64 in RECEIVED field 56), the IP address 72 of the mail server that sent the message, its own domain details (destinationserver.mil), and its unique ID 76. It also includes the email address of the victim (spoofvictim@destination.emailaddress.com), and date, time and day details. Thus, a so-called "paper trail" of details is provided in the transmission data mail header 42 which shows a history of the actual servers and domains since the inception of the email 40.

Figure 3:
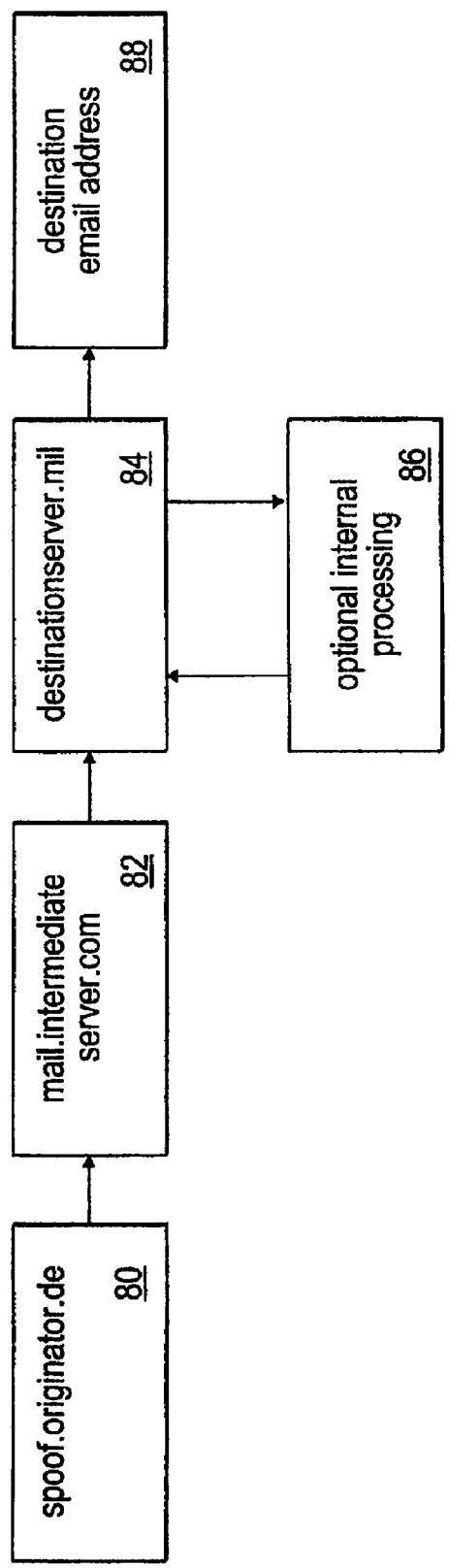
FIG. 3 shows a schematic block diagram of a server arrangement that may be used by a spoof originator to send spoofed email.

As mentioned above, the transmission data mail header 42 may include a plurality of RECEIVED fields 56, 58 wherein each field is added via a server via which the email 40 is communicated to its final destination. Typically, a spoofed email from a person of devious intent is sent to an intermediate server in order to attempt to conceal the actual source of the email as shown in FIG. 3. In particular, a sender of spoofed email e.g. via the PC 24 communicates it to the ISP 26 which is shown as server 80 in FIG. 3 (spooforiginator.de). Thus, in the present example, the spoof originator is located in Germany and communicates with his or her local ISP identified as spoof.originator.de. Thereafter, the email message 40 is communicated to an intermediate server 82 (mail.intermediateserver.com) in order to attempt to disguise the source of the email 40. Thereafter, the email 40 is sent to the destination server 84 (destinationserver.mil) and, in certain circumstances, optional internal processing may take place at the destination server 84 as shown at block 86. The destination server 84 then communicates the email 40, after adding its RECEIVED field 58 to the mail header, to the destination email address 88, which the PC 28 may then receive from its ISP 30. The above discussion provides an example of how a spoofer communicates spoofed email using various servers to the destination PC 28 wherein the actual source displayed in the visible mail header 44 is disguised. However, in accordance with the present application, the email 40 may be authenticated by investigating data in the mail header of the email 40 and generating an authenticity indicator in response to the investigation.

Figure 4:
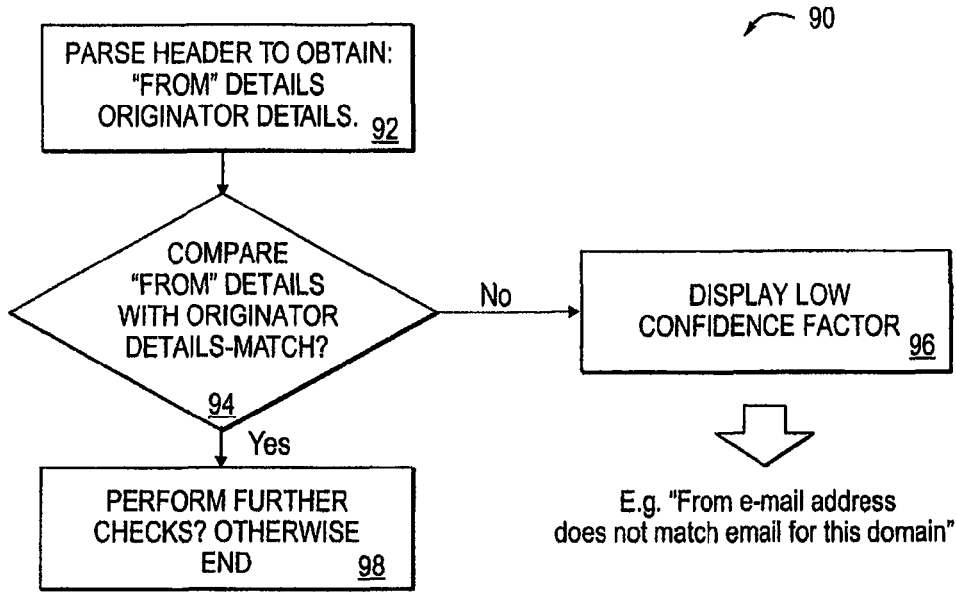
FIG. 4 shows a schematic flow diagram of a method, in accordance with the application, for comparing originator data in a header of an email.
Figure 5:
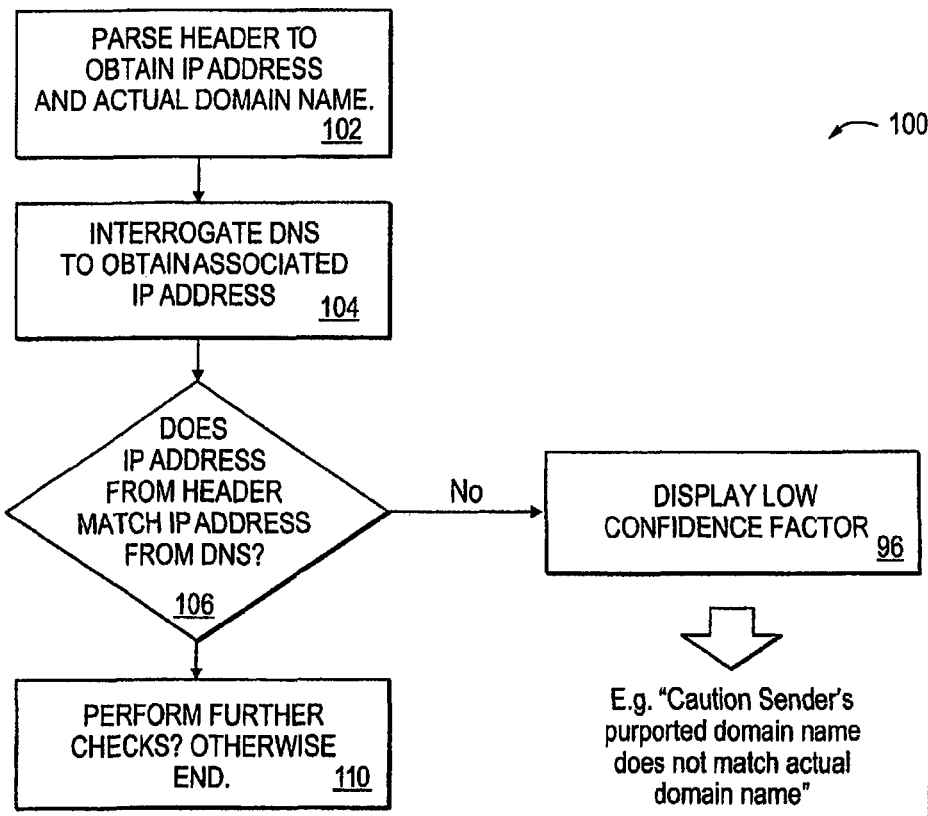
FIG. 5 shows a schematic flow diagram of a method, in accordance with the application, for investigating domain name data in a header of an email.

Referring in particular to FIG. 4, reference numeral 90 generally indicates a method, in accordance with an exemplary embodiment of the application, for authenticating the email 40. At block 92, the method 90 parses the transmission data mail header 42 and the visible mail header 44 to obtain transmission details. In particular, the method 90 investigates or analyses the visible mail header 44 to extract details or data included in the FROM field 50 such as the domain name of the purported sender (hotmail.com). Further, the method 90 analyses the transmission data mail header 42 to extract actual originator data such as the actual domain name of the actual sender of the email 40 from the RECEIVED field 56. The actual domain name from which the email 40 was sent is provided in the from section 60 and is shown as "spoof.originator.de" in the email 40. Once the aforementioned data has been extracted, as shown at decision block 94, the method 90 then compares the domain name from the FROM field 50 (purported sender data) with the domain name from the RECEIVED field 56 (actual originator data) and, if the two domain names do not match, the method 90 provides a confidence factor or authenticity indicator to the recipient of the email as shown at block 96. In one embodiment, the confidence factor displayed by the method 90 is in the form of a comment such as, for example, "this email is from an email address that does not match the mail server for its domain", "this email does not appear to have been sent from the purported sender", or the like. It is however to be appreciated that any warning or confidence factor may be provided to the recipient of the email. For example, in certain embodiments, the confidence factor may be in the form of number within a particular range e.g. 1 to 10, a percentage, or the like. Returning to decision block 94, if the domain name extracted from the FROM field 50 matches the domain name in the RECEIVED field 56, the method 90 may then perform further checks as shown at block 98 or it may terminate.

Reference numeral 100 generally indicates a further method, in accordance with an exemplary embodiment of the application, for authenticating the email 40. The method 100 parses the header, in particular the transmission mail header 42, to obtain a purported IP address 62 from the RECEIVED field 56 (see block 102). Thereafter, at block 104, the method 100 interrogates or communicates with the DNS 32 (see FIG. 1) during which the actual domain name of the sender 60 extracted from the RECEIVED field 56, is communicated to the DNS 32 to obtain an IP address associated with the domain name extracted from section 60. The DNS 32 returns an IP address associated with the actual domain name as shown by line 36 in FIG. 1 (the actual IP address of the actual originator). At decision block 106, the method 100 then compares the actual IP address obtained from the DNS 32 with the purported IP address 62 provided in the RECEIVED field 56 and, if they do not match, a low authenticity indicator is displayed to the user as shown at block 108. For example, as in the case of the authenticity indicator displayed by the method 90, the authenticity indicator displayed by the method 100 may include a warning such as "Caution: sender's purported domain name does not match actual domain name". It is however to be appreciated that any message or indicator may be provided to the user to alert the user of the discrepancy. Thus, a user is warned if the IP address 62 is not associated with the actual originator of the email. Returning to decision block 106, if the IP address from the header does in fact match the IP address 62 from the DNS 32, then the method 100 may perform further checks as shown at block 110 or otherwise terminate.

Figure 6:
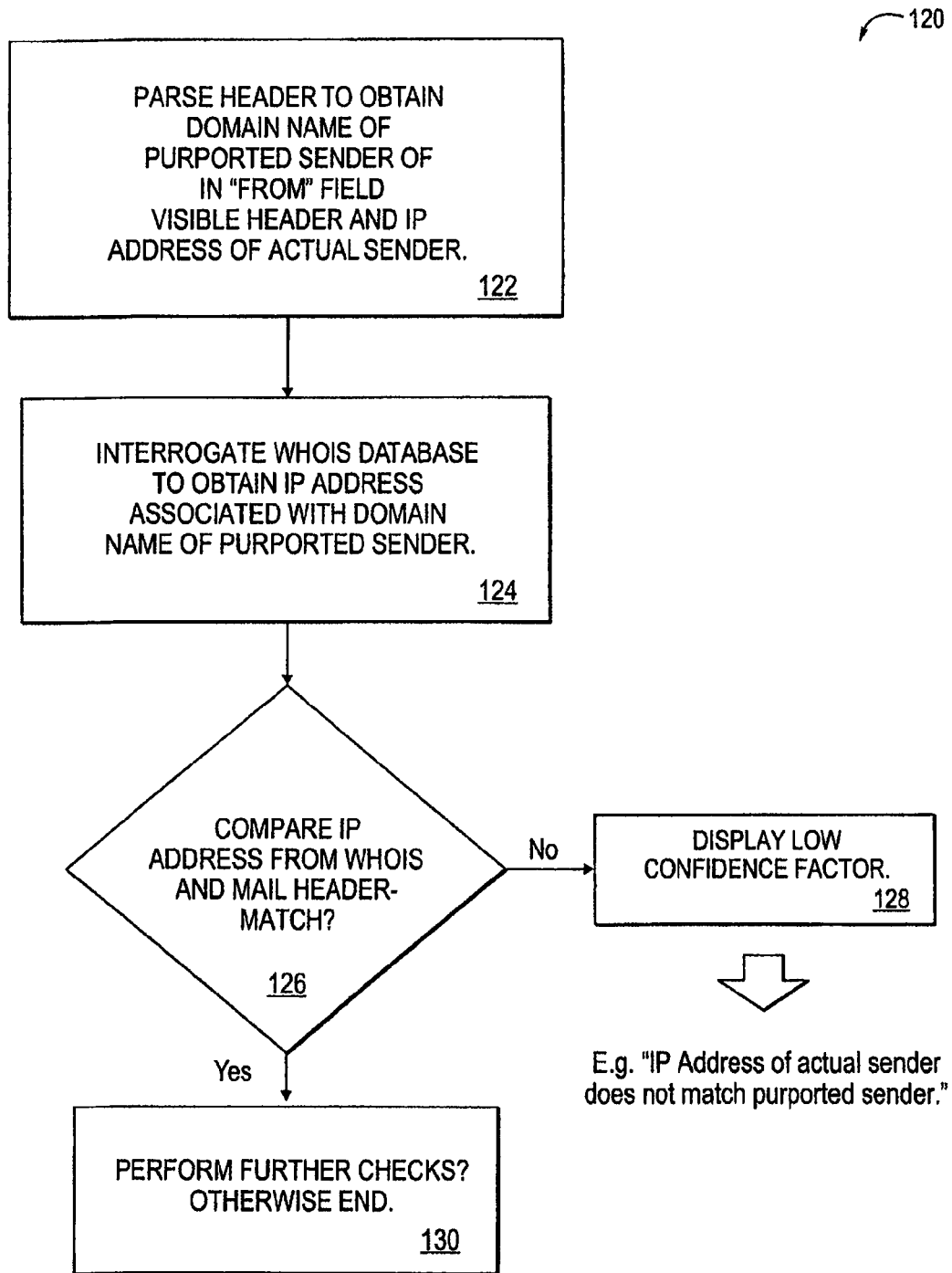
FIG. 6 shows a schematic flow diagram of a method, in accordance with the application, for investigating an IP address provided in a header of an email.

Referring in particular to FIG. 6, reference numeral 120 generally indicates a method, in accordance with a further exemplary embodiment of the application, for authenticating the email 40. When executed, the method 120 parses the visible mail header 44 to obtain the domain name of the purported sender from the FROM field 50 and also obtains the IP address 62 from the RECEIVED field 56 of the transmission data mail header in block 122. Thereafter, the method 120 interrogates or communicates with a "WHOIS" database. In particular, the method 120 provides the WHOIS database with the purported domain name (hotmail.com) of the purported sender to obtain an IP address associated with the particular domain name of the purported sender as shown at block 124. Thereafter, at decision block 126, the method 120 compares the IP address from the WHOIS database with the IP address 62 extracted from the transmission data mail header 42 to determine whether or not they match. If, as shown at block 128, the domain name from the WHOIS database and the transmission data mail header 42 do not match, then a low confidence factor or authenticity indicator is displayed to the user. For example, the method 120 may indicate to the user that the "IP address of the actual sender does not match that of the purported sender". However, if the IP address from the WHOIS database and the mail header match then, as shown at block 130, the method may terminate or perform further checks.

It is to be appreciated that any one or more of the exemplary methods 90, 100, and 120 may be performed when validating or authenticating electronic mail. Further, the confidence factor or authenticity indicator provided to the user may be in any form which indicates a warning or cautions the user of the possibility of the email 40 being spoofed. Likewise, in other embodiments of the application, the authenticity indicator may be provided when there is a match between the various parts of the header being investigated.

Figure 7:
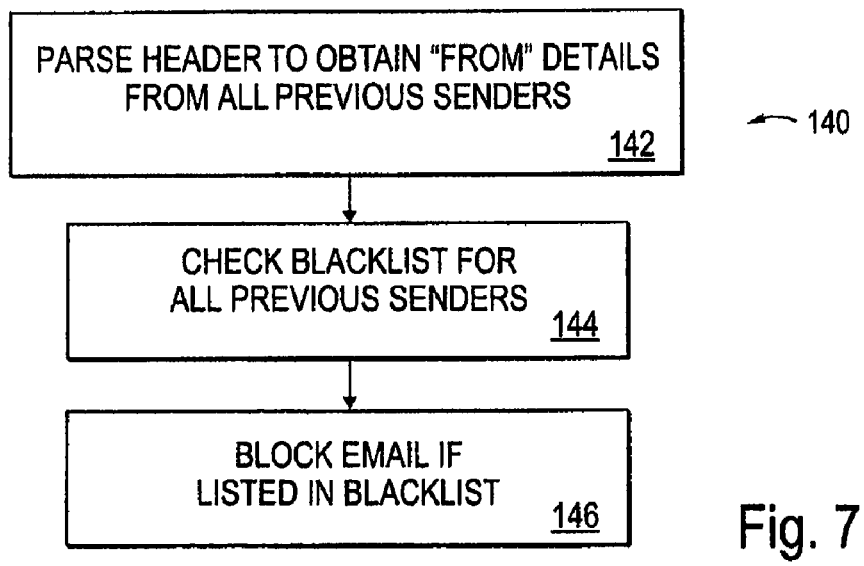
FIG. 7 shows a schematic flow diagram of a method for checking a blacklist including sources from which a spoofed email may be sent.
Figure 8:
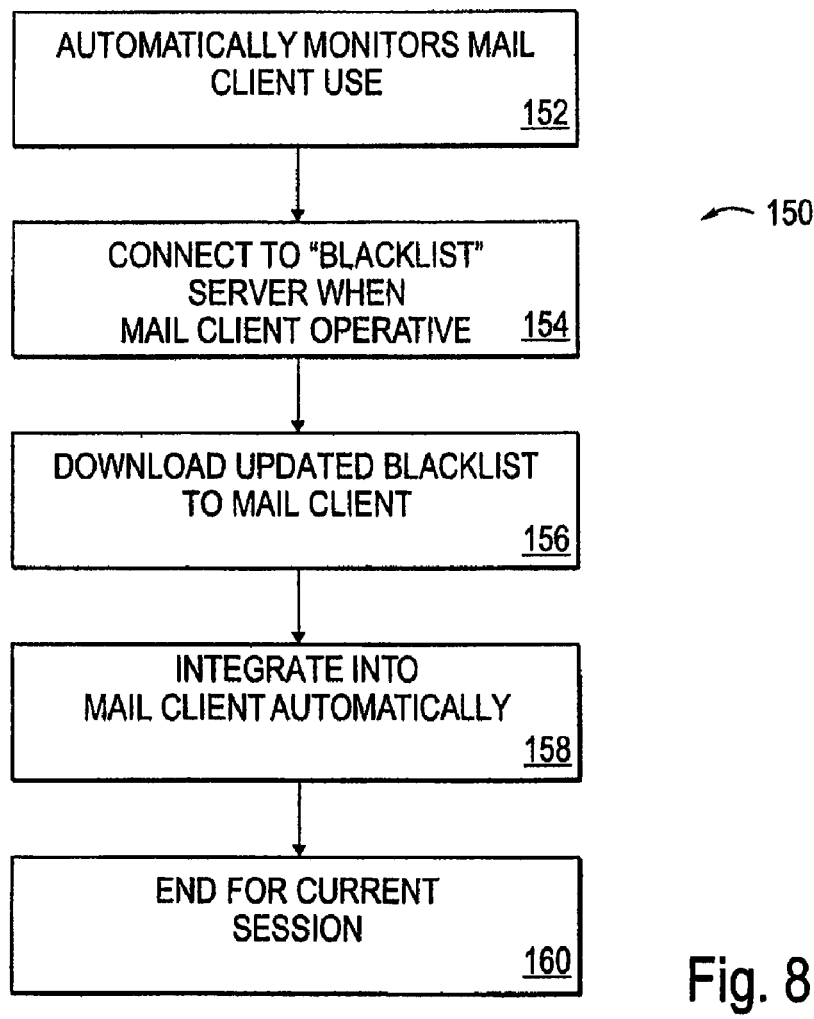
FIG. 8 shows a schematic flow diagram of a method, in accordance with the application, for updating a blacklist of potential senders of spoofed email.
Figure 9:
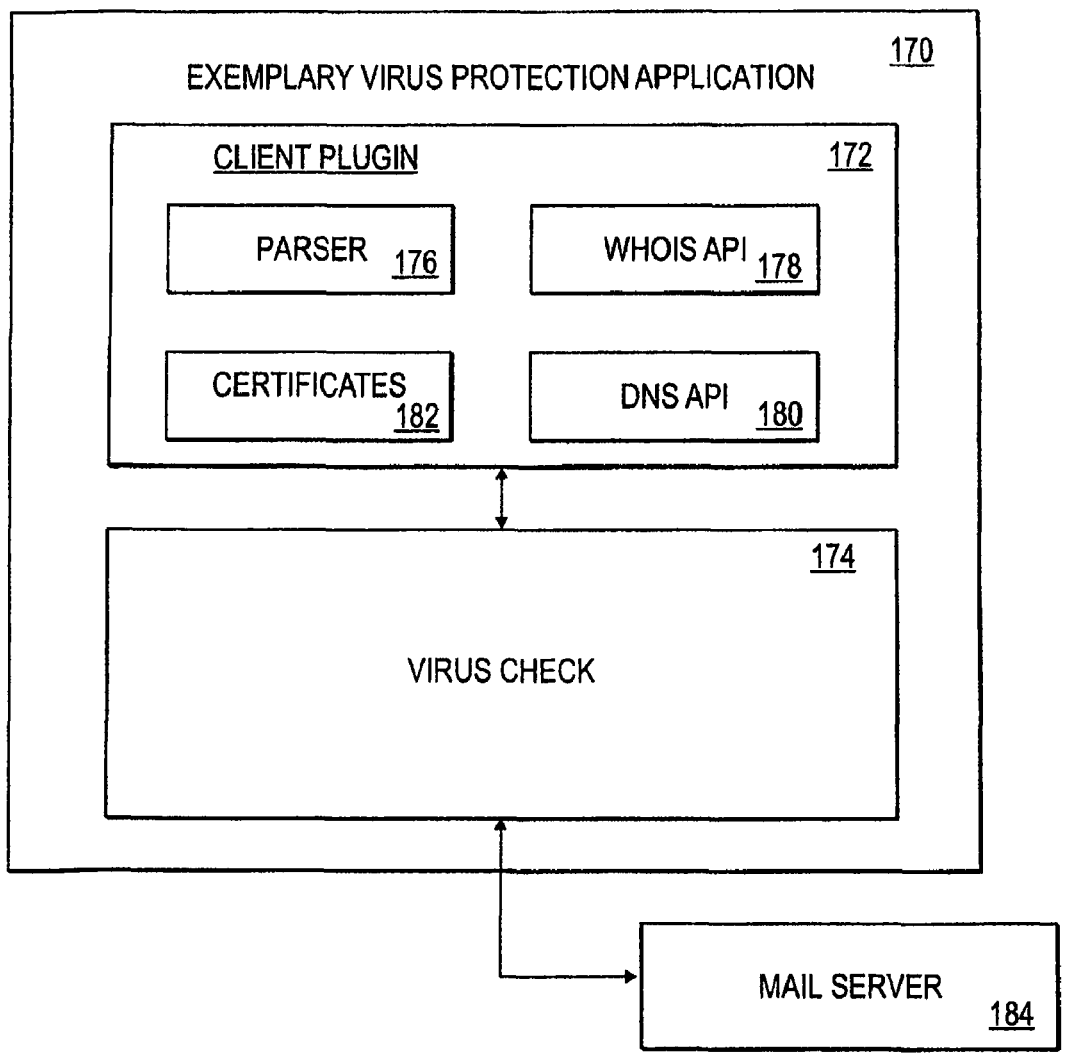
FIG. 9 shows a schematic block diagram of an exemplary virus protection application, in accordance with the application, which checks for spoofed email.
Figure 10:
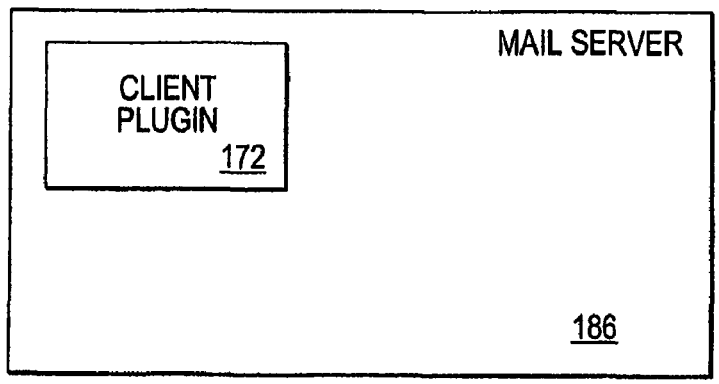
FIG. 10 shows a schematic block diagram of a mail server including a client plugin for identifying potentially spoofed email.

Referring to FIG. 7, reference numeral 140 generally indicates a further method, in accordance with an exemplary embodiment of the application, for authenticating an email. The method 140 parses the transmission data mail header 42 to obtain domain name data in the from sections 60, 70 of the RECEIVED fields 56, 58 respectively. If the email 40 has passed through further servers, these fields are also investigated in the RECEIVED fields added by the further servers to obtain a comprehensive list of all domain names in the header of the email 40 (see block 142). Thereafter, the domain names extracted from the transmission data mail header 42 are compared to a blacklist of senders as shown in block 144. The blacklist of senders includes a list of all domain names that are likely to be a source of unwanted email such as spoofed email and, as in the methods described above, a confidence factor or authenticity indicator may be provided to the recipient (reader) of the email 40. In certain embodiments, the method 140 blocks emails which have been sent from a blacklisted server as shown in block 146. In one embodiment, in order to enhance the effectivity, the method 140 updates its blacklist of emails using the exemplary method 150 of FIG. 8.

The method 150, as shown at block 152, automatically monitors when a user activates a mail client on a PC. When the method 150 detects user activity or an appropriate connection (e.g. to the Internet), it connects to a blacklist server as shown at block 154. In one embodiment, the method 150 connects to the blacklist server when the mail client is operative. As shown at block 156, the method 150 then downloads an updated blacklist to the mail client and thereafter integrates the updated list into the mail client in an automated fashion, as shown at block 158. Once the updated blacklist has been downloaded, the method 150 typically terminates for the current session as shown at block 160.

Reference numeral 170 generally indicates an exemplary virus protection application, which in addition to its virus protection functionality, includes one or more of the methods 90, 100, 120, 140 and 150. In one embodiment, the application 170 includes the methods 90, 100, 120, 140 and 150 in the form of a client plugin 172 which interacts with virus check functionality 174. To execute the functionality described above, the client plugin 172 includes a parser module 176, a WHOIS API 178, a DNS API 180 and digital certificates 182. The application 170 is typically provided on a client machine (e.g. PCs 24 and 28) and communicates with a mail server 184 so that, when the client machine receives email from the mail server 184, the client plugin 172 authenticates the email 40 as described herein. Thus, each time the virus protection application 170 checks an email for a virus, it also authenticates the email to obtain an authentication indicator which informs a user of the likelihood of the email being spoofed.

Although the application 170 typically resides on a client machine, in other embodiments of the application, the client plugin 172 is provided on a mail server 186. Thus, prior to the client machine downloading messages from the mail server 186, the mail server 186 performs the authentication methodology described herein. The appropriate messages may then be included in information communicated to the client machine.

Figure 11:
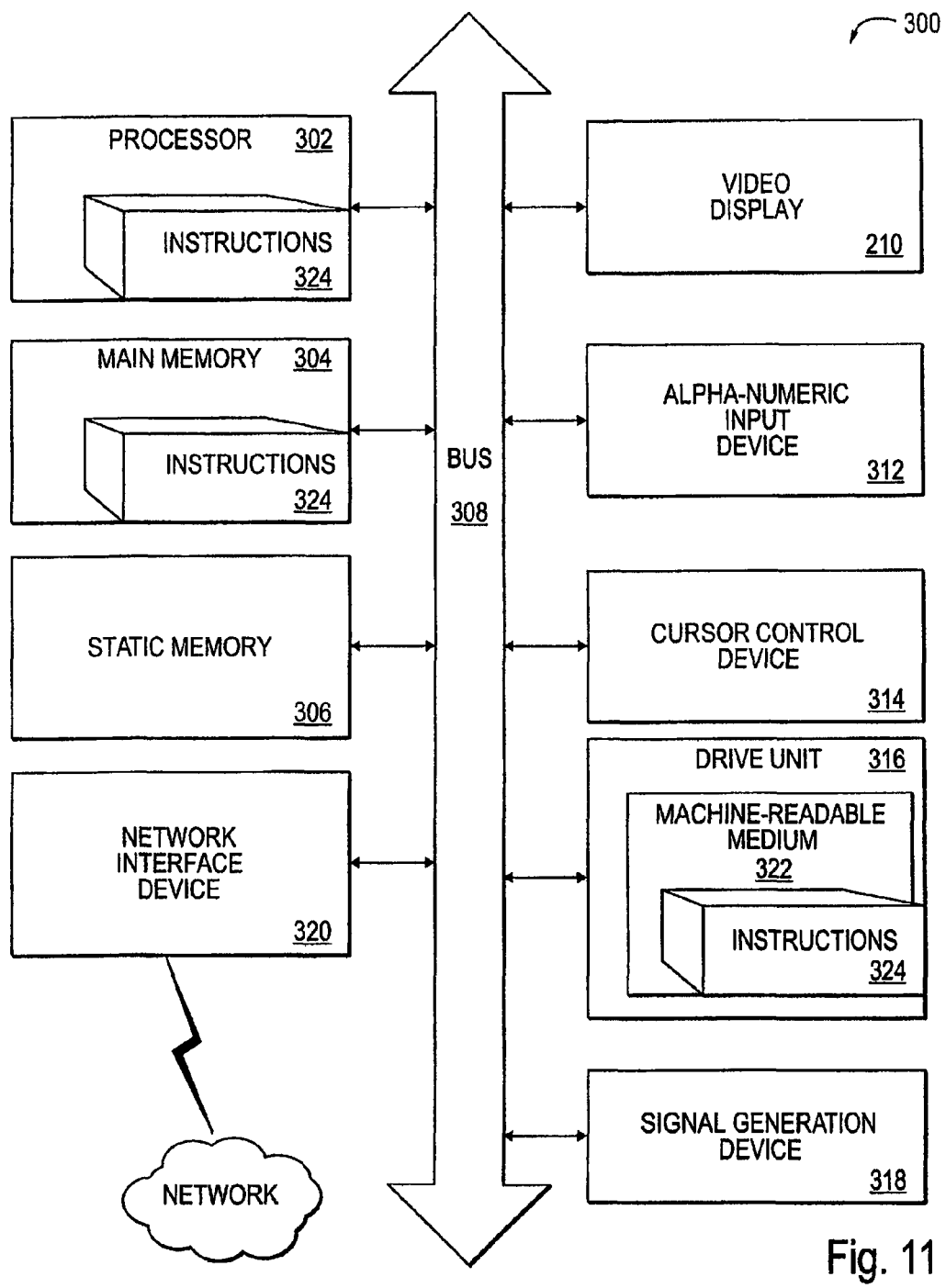
FIG. 11 shows a schematic block diagram of an exemplary computer for executing any one of the methods described herein.

FIG. 11 shows a diagrammatic representation of machine in the exemplary form of the computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g. a keyboard), a cursor control device 314 (e.g. a mouse), a disk drive unit 316, a signal generation device 318 (e.g. a speaker) and a network interface device 320. The various components of the computer system 300 may be included in the mail server 186.

The disk drive unit 316 includes a machine-readable medium 322 on which is stored a set of instructions (software) 324 embodying any one, or all, of the methodologies described above. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present application. The term "machine-readable medium" shall accordingly be taken to included, but not be limited to, solid-state memories, optical and magnetic disks, and carrier wave signals.

Thus, a method and apparatus for authenticating an email have been described. Although the present application has been described with reference to specific exemplary embodiments, it will be evident that various modifications and changes may be made to these embodiments without departing from the broader spirit and scope of the application. Accordingly, the specification and drawings are to be regarded in an illustrative rather than a restrictive sense.

What is claimed is:

1. A method of authenticating an electronic communication, the method including:
   parsing a header of the electronic communication to identify actual domain name data included in the header at a server receiving the electronic communication from a communication client;
   parsing the header to obtain purported sender data included in the header of the electronic communication;
   interrogating a Domain Name Server (DNS) with the actual domain name data to obtain an associated IP address of an actual domain name;
   comparing the actual domain name data and purported sender data; and
   generating in response to the comparison an authenticity indicator, to provide a recipient of the electronic communication with an indication of the likelihood that the electronic communication was sent from a purported sender of the electronic communication.

2. The method of claim 1, in which parsing the header to obtain purported sender data includes:
   parsing the header to obtain purported sender domain name data in a "FROM: . . . " field populated at the communication client, the purported sender domain name data being visible to a recipient of the electronic communication.

3. The method of claim 1, in which parsing the header to obtain purported sender data includes:
   parsing the header to obtain a purported IP Address of an originator of the electronic communication;
   comparing the associated IP address with the purported IP address; and
   generating the authenticity indicator in response to the comparison.

4. The method of claim 1, which is executed in conjunction with virus protection software.

5. The method of claim 1, wherein the header of the electronic communication includes a visible communication header which is visible to the recipient when opening the electronic communication, and a transmission data communication header including received data included by at least one server via which the electronic communication is communicated, the method including investigating data in both the visible and transmission data communication headers.

6. The method of claim 1, in which parsing the header to obtain purported domain name data includes:
   parsing the header to obtain domain name data of each server via which the electronic communication has been communicated;
   comparing the domain name data of each server with reference domain name data; and
   generating the authenticity indicator in response to the comparison.

7. The method of claim 6, wherein the reference domain name data includes domain names associated with spoofed electronic communication, the method including updating the reference domain name data in an automated fashion.

8. The method of claim 7, wherein the reference domain name data is stored on a client machine, the method including:
   connecting the client machine to a remote database of reference domain name data;
   downloading updated reference domain name data; and
   storing the reference domain name data on the client machine.

9. A machine-readable medium embodying a sequence of instructions that, when executed by a machine, cause the machine execute a method of authenticating an electronic communication, the method including:
   parsing a "received" field of a header of the electronic communication to identify actual domain name data included in the header at a server receiving the electronic communication from a communication client;
   parsing the header to obtain purported sender data included in the header of the electronic communication;
   interrogating a Domain Name Server (DNS) with the actual domain name data to obtain an associated IP address of an actual domain name;
   comparing the actual domain name data and purported sender data; and generating in response to the investigation an authenticity indicator, to provide a recipient of the electronic communication with an indication of the likelihood that the electronic communication was sent from a purported sender of the electronic communication.

10. The machine-readable medium of claim 9, wherein parsing the header to obtain purported sender data includes:
parsing the header to obtain purported sender domain name data in a "FROM:" field populated at the communication client, the purported sender domain name data being visible to a recipient of the electronic communication.

11. The machine-readable medium of claim 9, wherein parsing the header to obtain purported sender data includes:
parsing the header to obtain a purported IP Address of an originator of the electronic communication;
comparing the associated IP address with the purported IP address; and
generating the authenticity indicator in response to the comparison.

12. The machine-readable medium of claim 9, wherein the instructions are executed in conjunction with virus protection software.

13. The machine-readable medium of claim 9, wherein the header of the electronic communication includes a visible communication header which is visible to the recipient when opening the electronic communication, and a transmission data communication header including received data included by at least one server via which the electronic communication is communicated, the method including investigating data in both the visible and transmission data communication headers.

14. The machine-readable medium of claim 9, wherein parsing in the header to obtain purported domain name data includes:
parsing the header to obtain domain name data of each server via which the electronic communication has been communicated;
comparing the domain name data of each server with reference domain name data; and
generating the authenticity indicator in response to the comparison.

15. The machine-readable medium of claim 14, wherein the reference domain name data includes domain names associated with spoofed electronic communication, the method including updating the reference domain name data in an automated fashion.

16. The machine-readable medium of claim 15, wherein the reference domain name data is stored on a client machine, the method including:
connecting the client machine to a remote database of reference domain name data;
downloading updated reference domain name data; and
storing the reference domain name data on the client machine.

17. A communication server for authenticating electronic communication communicated between the communication server and at least one client device, the communication server including:
a memory which includes a set of instructions which, when executed by a processor, cause the processor to:
parse a "received" field of a header of the electronic communication to identify actual domain name data included in the header at a server receiving the electronic communication from a communication client;
parse the header to obtain purported sender data included in the header of the electronic communication;
interrogate a Domain Name Server (DNS) with the actual domain name data to obtain an associated IP address of an actual domain name;
compare the actual domain name data and purported sender data; and
generate in response to the comparison an authenticity indicator, to provide a recipient of the electronic communication with an indication of the likelihood that the electronic communication was sent from a purported sender of the electronic communication.

18. The communication server of claim 17, in which the processor:
parses the header to obtain purported sender domain name data in a "FROM:" field populated at a communication client, the purported sender domain name data being visible to a recipient of the electronic communication.

19. The communication server of claim 17, in which the processor:
parses the header to obtain a purported IP Address of an originator of the electronic communication;
compares the associated IP address with the purported IP address; and
generates the authenticity indicator in response to the comparison.

20. The communication server of claim 17, in which the processor:
parses the header to obtain domain name data of each server via which the electronic communication has been communicated;
compares the domain name data of each server with reference domain name data; and
generates the authenticity indicator in response to the comparison.

* * * * *

UNITED STATES PATENT AND TRADEMARK OFFICE
CERTIFICATE OF CORRECTION

| | | |
|---|---|---|
| PATENT NO. | : 8,078,683 B2 | Page 1 of 1 |
| APPLICATION NO. | : 12/884808 | |
| DATED | : December 13, 2011 | |
| INVENTOR(S) | : Chris Lalonde et al. | |

It is certified that error appears in the above-identified patent and that said Letters Patent is hereby corrected as shown below:

On Sheet 2 of 8, above Reference Numeral 62, Figure 2, line 1, delete "emailadddress" and insert -- emailaddress --, therefor.

In column 1, line 34, delete "in formation" and insert -- information --, therefor.

In column 4, line 31, delete "(spooforiginator.de)." and insert -- (spoof.originator.de). --, therefor.

In column 5, line 23, after "transmission" insert -- data --.

In column 7, line 42, delete "included." and insert -- include, --, therefor.

In column 8, line 9, in Claim 2, delete ""FROM: . . ."" and insert -- "FROM:" --, therefor.

In column 8, line 53, in Claim 9, delete "A machine-readable" and insert -- A non-transitory machine-readable --, therefor.

Signed and Sealed this
Twenty-fifth Day of September, 2012

David J. Kappos
*Director of the United States Patent and Trademark Office*